United States Patent
Shah et al.

(10) Patent No.: US 10,770,114 B2
(45) Date of Patent: Sep. 8, 2020

(54) VIDEO MATRIX BARCODE SYSTEM

(71) Applicant: VISA INTERNATIONAL SERVICE ASSOCIATION, San Francisco, CA (US)

(72) Inventors: Nishit Shah, Mumbai (IN); Ravi Krishnan Muthukrishnan, Bangalore (IN); Krishnaprasad Kumbalath, Thrissur (IN); Shakti Nilesh, Bangalore (IN); Raghavendra Ganlaparthi, Bangalore (IN); Rohit Lawange, Akola (IN); Soujanya Yalal, Hyderabad (IN)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/611,603

(22) PCT Filed: May 9, 2017

(86) PCT No.: PCT/US2017/031780
§ 371 (c)(1),
(2) Date: Nov. 7, 2019

(87) PCT Pub. No.: WO2018/208293
PCT Pub. Date: Nov. 15, 2018

(65) Prior Publication Data
US 2020/0168253 A1    May 28, 2020

(51) Int. Cl.
*G11B 27/036*    (2006.01)
*G06K 7/14*    (2006.01)

(52) U.S. Cl.
CPC .......... *G11B 27/036* (2013.01); *G06K 7/1417* (2013.01)

(58) Field of Classification Search
CPC .......................... G11B 27/036; G06K 7/1417
See application file for complete search history.

(56) References Cited

U.S. PATENT DOCUMENTS

| 10,091,544 | B1 * | 10/2018 | Poffenberger | H04N 21/8358 |
| 2014/0189115 | A1 * | 7/2014 | Eggert | H04W 12/08 709/225 |
| 2016/0142227 | A1 * | 5/2016 | Li | H04L 25/0226 375/295 |

* cited by examiner

*Primary Examiner* — Mishawn N. Hunter
(74) *Attorney, Agent, or Firm* — Loeb & Loeb LLP

(57) ABSTRACT

A data object is parsed into payload data packets so that each data packet is capable of being represented in a matrix barcode, sometimes referred to as a QR code. A matrix barcode is generated for each payload data packet and accompanying metadata used to reconstruct the data object. A matrix barcode movie is assembled from individual matrix barcodes. The resulting movie can be projected to a reader that captures the video sequence, examines each frame to extract payload data and corresponding metadata from each frame. The reader then assembles the separate payload data back into the original data object using the metadata and determines an action to take responsive to the data object. For example, a movie may be played, an image displayed, a file opened, or other action may be taken based on the file type and instructions in the metadata.

20 Claims, 4 Drawing Sheets

VIDEO MATRIX BARCODE SYSTEM

CROSS-REFERENCE TO RELATED APPLICATIONS

This application claims priority to and the benefit of International Patent Application No. PCT/US2017/031780, filed May 9, 2017, entitled "VIDEO MATRIX BARCODE SYSTEM," the entire contents of which are incorporated herein by reference.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Matrix barcodes, such as quick response or QR codes, are symbols that are widely used in packaging, advertising, transportation, and more for graphically storing information. Unlike simple one-dimension barcodes, the two-dimensional techniques used in matrix barcodes allow more data to be conveyed via the symbol. In some embodiments of matrix barcodes, nearly 3,000 characters of data can be stored. However, this is not always enough data to convey the amount of information desired.

SUMMARY

A data object that is too large to be conveyed in a single matrix barcode may be parsed into individual matrix barcode payloads, each with associated metadata for instructions on reassembling the original data object, the payloads and metadata rendered into individual matrix barcodes. These individual matrix barcodes may then be assembled into a matrix barcode movie. A signboard or other display type may be used to project the matrix barcode movie. A reader, such as a modified smartphone, may be used to capture the matrix barcode movie and extract the individual matrix barcodes that make up the movie. Each frame of the matrix barcode movie may contain payload data and metadata used to reassemble the original content. Color matrix barcodes, now being tested, can further increase the capacity of matrix barcode movies.

In environments where it may be insecure, undesirable, or simply inconvenient to broadcast information via a radio signal, the matrix barcode movie offers a method of limiting the dissemination of information to devices in a known position with respect to a matrix barcode movie display device, without any pairing, connecting, or other handshaking between the sender and the recipient. For some, the ability to receive information anonymously without leaving a Bluetooth or WiFi "trail" may be perceived as a particular advantage over radio-based information systems.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Matrix barcodes are used in industry, retail, product markings, web sites, and more for easily relaying information such as a URL or product information. One type of matrix barcode is the well-known QR Code, a registered trademark of Denso Wave Incorporated of Japan. Matrix barcodes are defined in several different formats that support data content sizes from several hundred to several thousand characters or bytes. Matrix barcodes may include codes as the nature of the data, including, but not limited to, a URL type for web addresses, a VCard type for business card data, a text type, email type, and more. All matrix barcodes follow the same basic formats of position, alignment, and timing markers, as well as data rows and columns. While higher density matrix barcodes may convey relatively large amounts of data, they may not always be capable of transferring the amount of data an advertiser or other user may desire.

Figure 1:
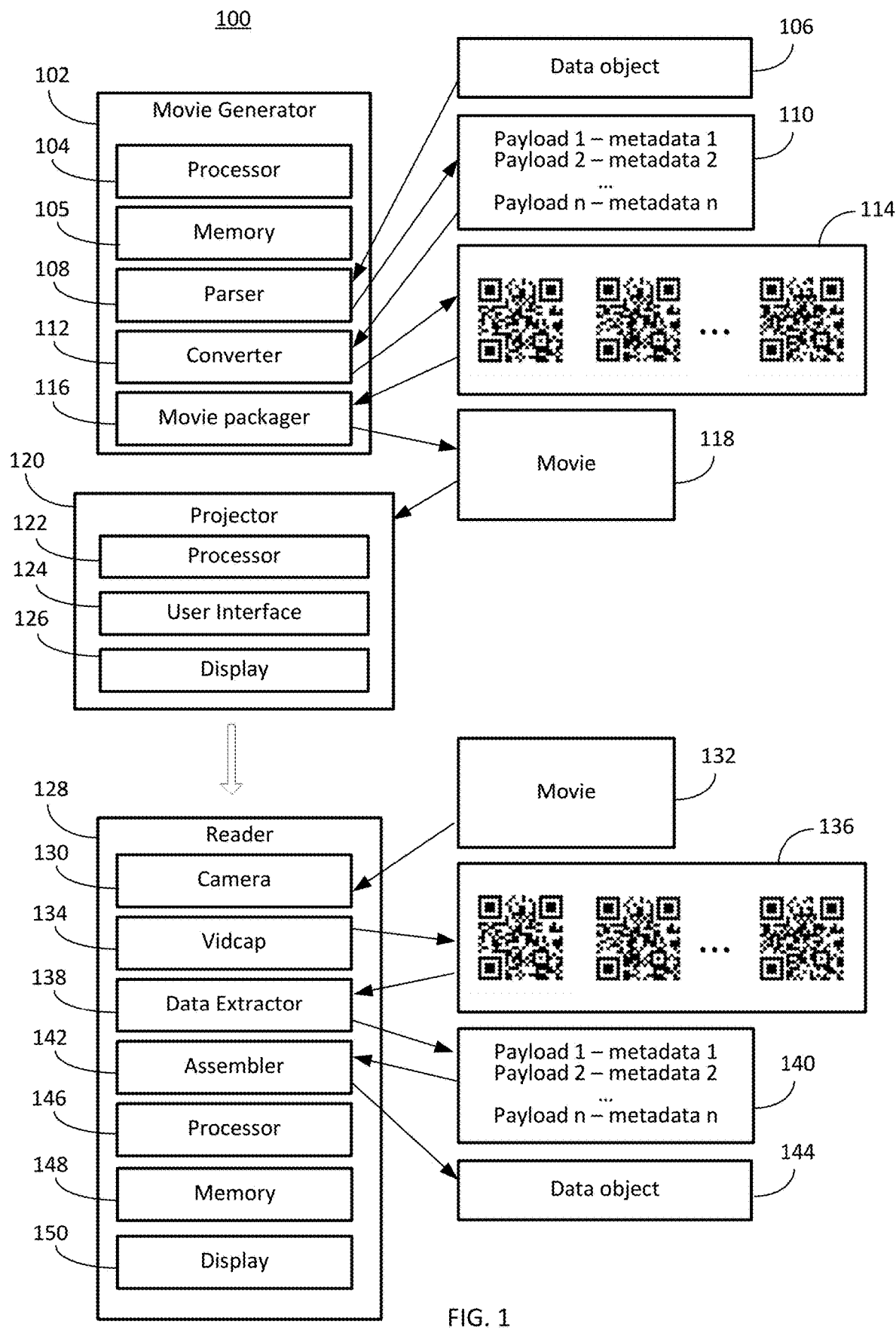
FIG. 1 is a system diagram illustrating system components and data generation in accordance with the current disclosure.

FIG. 1 illustrates one exemplary embodiment of a system 100 that addresses data size limitations of matrix barcodes. The system 100 includes a movie generator 102, a projector 120 and a reader 128. The movie generator 102 may be a processor-based machine including a processor 104 and memory 105. The processor 104 may execute commands stored in the memory 105, while the memory 105 may also include data and settings as well as executable code. The movie generator 102 may also include modules implemented in hardware or software that process data into videos.

In the illustrated embodiment, the movie generator 102 may have functional modules including a parser 108, a converter 112, and a movie packager 116. It will be recognized that the exact functions of each module may be combined or further separated based on the exact needs of the system 100, such as conversion speed, cost, throughput, etc. As such, some or all of the aspects of these modules 108, 112, 116 may be implemented in hardware when speed of processing is a factor. Similarly, the modules may be implemented in software when, for example, low cost is desirable and throughput is not a consideration.

The projector 120 may include a processor 122 and memory (not depicted) a user interface 124 and a display 126. The user interface 124 may include a specific input device such as a keyboard, cursor device, touch screen, or other manual interface. In an embodiment, more than one matrix barcode movie may be selectable on the display 126 via the user interface 124. A further manual interaction may cause the matrix barcode movie to begin playback. In another embodiment, the user interface 124 may include a camera or other sensor that is capable of reading information conveyed by the reader 128. For example, the user interface 124 may wait for an optical signal from the reader 128 before beginning playback of the movie or the optical signal may indicate the frame rate at which the matrix barcode movie is to be played. Alternatively, cover art for a particular matrix barcode movie may indicate a frame rate at which the movie will play so that the reader 128 may note the frame rate and in response adjust its capture rate accordingly.

The reader 128 may include a camera 130, a video capture module 134, a data extractor 138, and an assembler 142. The reader 128 may also include a processor 146, a memory 148, and a display 150. The camera 130 may be used to record the matrix barcode video played via the display 126 of the projector 120. A video capture (vidcap) module 134 decomposes the video back into individual matrix barcodes, the assembler 142 extracts the data from the individual matrix barcodes and creates a duplicate data object 144 corresponding to the original data object 106.

In operation, the movie generator receives a data object 106 and creates individual data payloads and associated metadata 110 via the parser module 108. The converter 112 then generates matrix barcodes 114 representing the separate payload/metadata pairs. In order to correctly parse the data payload and metadata 110 to the appropriate size, the parser 108 must be aware of the particular matrix barcode type that will be used by the converter 112 in order to ensure that adequate data space will be available in the matrix barcodes 114. A movie packager 116 may then perform a data compression on the individual matrix barcodes 114 using, for example, an H.264 compression scheme. The movie packager 116 may then place the compressed frames into a container to complete the development of the movie 118. In various embodiments the container may be an MP4, AVI, WMV, or any of numerous known movie container formats.

When creating the matrix barcode movie 118 from the individually encoded matrix barcode frames, the compression process may be set to make each frame an independent or I-frame, or may use a standard coding technique that selectively inserts I-frames at intervals. In the latter case, progressive or P-frames are generated between I-frames where each P-frame carries only the differences between frames since the last I-frame. A movie with nothing but I-frames may be larger than that possible using more aggressive compression with P-frames but may be easier to decode during presentation, which in turn may allow a less expensive display process to be used at the projector 120.

In another embodiment, the matrix barcode movie 118 may be transmitted as a movie file to the reader 128 where the reader 128 may decode the movie data directly into barcodes. In such a case, having individual I-frames may reduce the complexity of re-creating the matrix barcodes.

The projector 120 may receive the movie 118 via any suitable transport mechanism, including but not limited to, a removable memory, a wireless network, and a wired network. The movie 118 may be viewable via the display 126, such as product signage or active tags. In an embodiment, the movie 118 may play as a loop or may play responsive to a signal received either manually or from the reader 128. An indication of frame rate may be transmitted between the projector 120 and the reader 128. In various embodiments, the projector 120 may adjust the frame rate of the video as played or the reader 128 may adjust the video capture rate of the camera 130 based on the capabilities exchanged between the projector 120 and the reader 128. For example, some video utilities allow a video file to be replayed at a different frame rate from the original encoding. Particularly since audio is not a factor in the playback, adjusting the video frame rate can be accomplished using several known techniques.

A movie copy 132 is received at the reader 128 via the camera 130 and a process is begun to extract the individual frames of the movie 118. In this process the separate matrix barcodes are captured from the movie 118 and, in an embodiment, may be written out as individual image files of the matrix barcodes 136 via a video capture (vidcap) module 134. In order to ensure that each frame of the matrix barcode movie is captured, an application on a smartphone may allow adjustments to the frame rate of its camera. The matrix barcode sequence, or matrix barcode movie, may be played at a frame rate below the Nyquist rate of the camera capture speed. For example, a camera capable of recording 30 frames per second could be used to capture each unique matrix barcode if played at a rate below 30 frames per second, for example, at 15 frames per second.

The recreated individual matrix barcodes 136 may processed by a data extractor 138 to generate the individual payload data and metadata 140 associated with each matrix barcode. An assembler 142 may use the metadata to reassemble the payload data to duplicate the original data object 106 in a new data object 144.

In various embodiments, the data object 144 may be used in taking an action. For example, in one embodiment, the data object 144 may be a URL and an action would be to open the URL. In another embodiment, the data object 144 may be a multimedia object with text and images, and the action may be to present the information on the display 150. In another embodiment, the data object 144 may be a digital certificate with a cryptographic key and the action may be to store the certificate in a browser's certificate store. The action to be taken may be determined in any of several ways. In one embodiment, the data object 144 may have a file type that indicates what action to take, for example, a .pdf file extension may indicate that the file should be opened in a PDF viewer and a .doc file extension may indicate that the file should be opened in Microsoft Word™. In another embodiment, one or more elements of the metadata included in the matrix barcodes 114, 136 may indicate what action to take with the data object 144. Based on local security policies, the action may require intervention from a user or operator of the reader 128. The reader 128 may also include a processor 146, a memory 148, and a display 150 that combine to run executable programs and allow user interactions with the reader 128.

Figure 2:
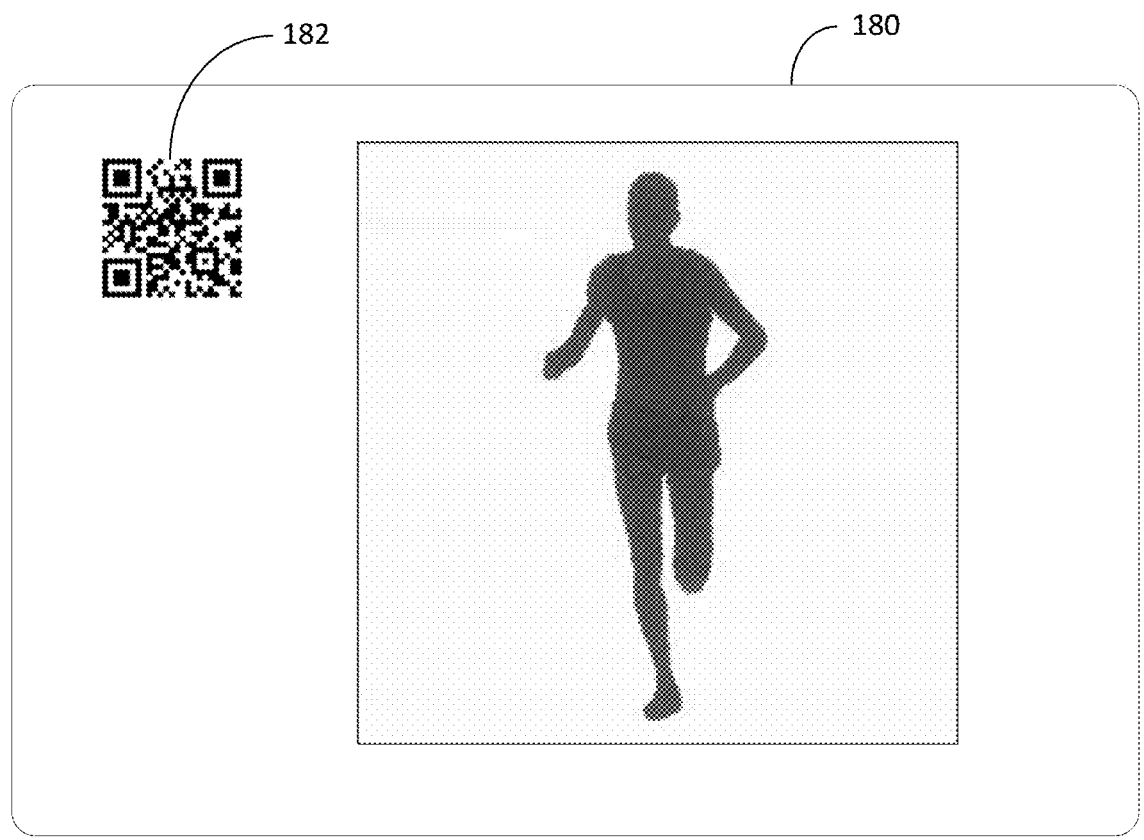
FIG. 2 is an illustration of an embodiment of a matrix barcode movie.

FIG. 2 is an illustration of an embodiment of deploying a matrix barcode movie. In this illustration, a matrix barcode movie 182 is incorporated in another media platform other than as a standalone element. Shown here, the matrix barcode sequence is incorporated in the normal frame sequence of another media, such as a movie. In other embodiments, the matrix barcode movie may be incorporated media platforms including video advertising, how-to media of in-store displays, animated graphic image format (GIF) sequences, video games, etc. In this embodiment, the reader 128 may capture the matrix barcode frames in the same manner described herein.

Figure 3:
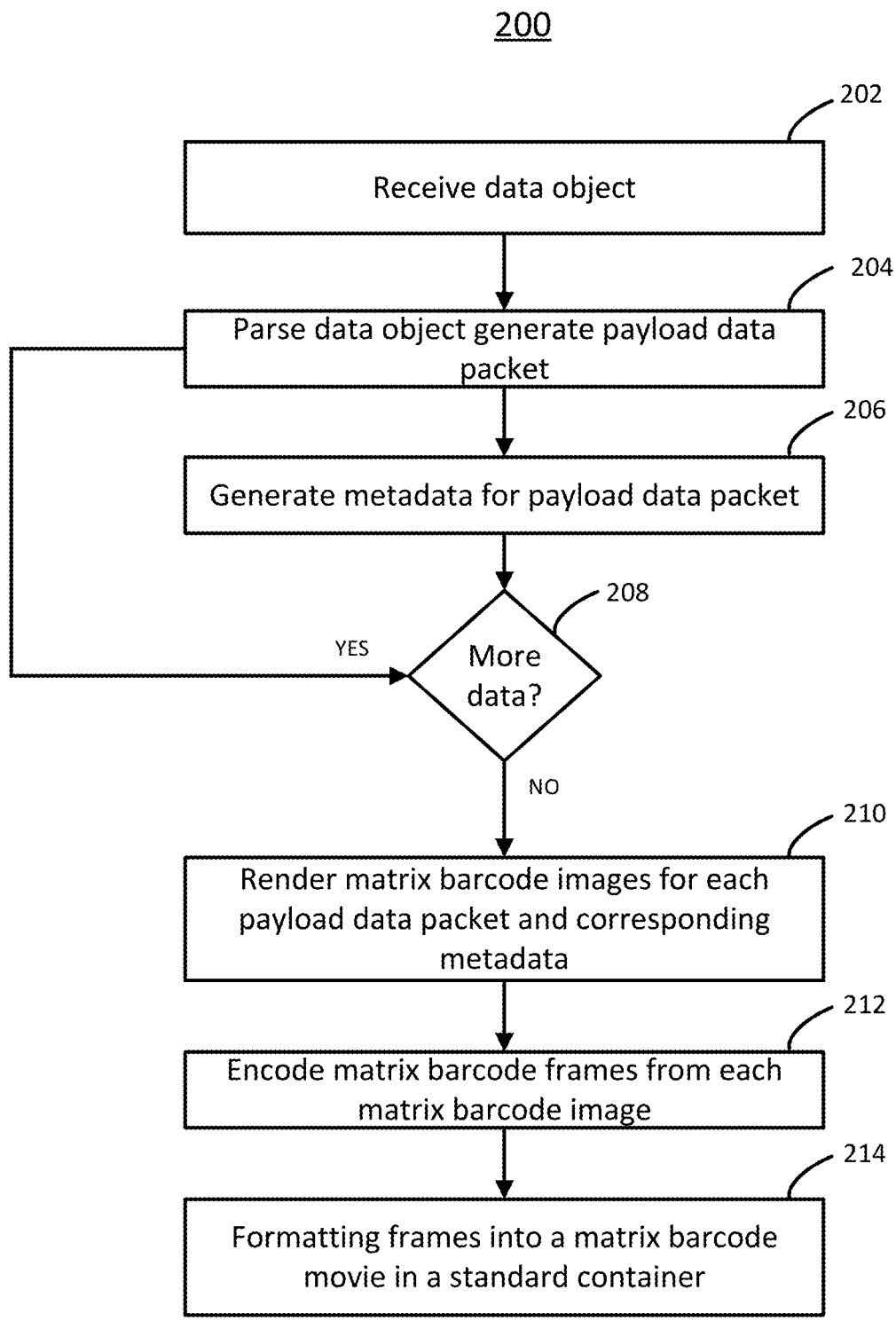
FIG. 3 is a flowchart of a method of generating a matrix barcode movie.

FIG. 3 is a flowchart of a method 200 of creating a matrix barcode movie 118. At block 202, a data object 106 may be received at a movie generator 102. In an embodiment, the data object 106 may be larger than the capacity of a single matrix barcode of a particular type. The choice of matrix barcode type may be based on any of several factors but relevant to this disclosure is only that the selected matrix barcode type is not capable of encoding the entire data object 106 in a single image. At block 204, the data object 106 may be parsed into individual payload data packets and corresponding metadata generated for each payload data packet at block 206. The metadata may use a predetermined format to indicate the start and size of the metadata and a start and size of the payload data packet for use in decoding. The metadata may also include a sequence number for its corresponding data payload data packet to allow resequencing the parsed data during reassembly. The process may be repeated via block 208 until the entire data object 106 is parsed into payload data packets and corresponding metadata 110.

A matrix barcode image may be rendered for each of the payload data packets and its corresponding metadata at block 210. The resulting matrix barcodes 114 can be placed in any sequence although there is a logical rational to place them in the order they were created and will be decoded. The resulting individual matrix barcodes, as images, may be encoded into matrix barcode frames at block 212. In an embodiment, the barcode images may be encoded into an H.264 format or other similar video compression format. At block 214, the encoded frames may then be formatted into a matrix barcode movie 118 in any of several well-known containers. These container formats may include MP4, AVI, or WMV formats, among others. In an embodiment, the matrix barcode movie 118 may be named to include a container designator, e.g., filename.mp4. Additionally, the filename may include a framerate of the movie 118, e.g., filename15.mp4 to indicate an MP4 container with a 15 frames/second frame rate.

Figure 4:
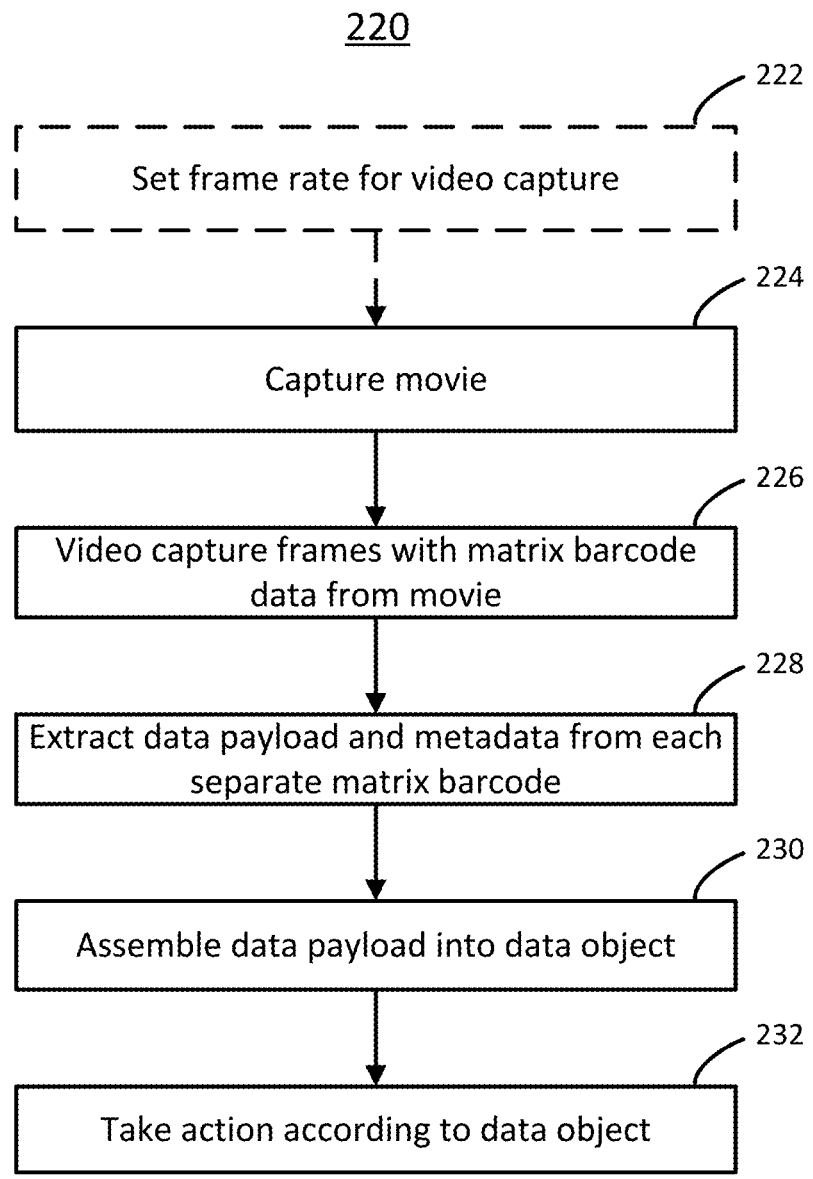
FIG. 4 is a flowchart of a method of decoding a matrix barcode movie.

A flowchart of a method 220 of decoding and acting on a matrix barcode movie is illustrated in FIG. 4. At block 222, a frame rate for video capture may optionally be set for a camera 130 of a reader 128. An indication of a desired, or in some cases, a minimum frame rate may be transmitted from the projector 120 to the reader 128 via an optical signal directly or by instructing a user of the reader to manually set the frame rate via a user interface of the reader 128. For example, a cover art shown on the display 126 may indicate the frame rate of the movie or a minimum frame rate setting for the camera 130.

At block 224, the movie 118 may be presented by the projector 120 and received at the reader 128 by the camera 130 so that a movie file 132 is created at the reader. At block 226, a video capture module 134 may be used to convert the frames of the matrix barcode movie 132 into the individual matrix barcode images 136 of the original matrix barcodes 114. After the matrix barcode images 136 have been extracted, at block 228 the payload data packet and corresponding metadata 140 for each barcode may be read. A de-duplication process may eliminate duplicate frames that may be created via oversampling of the movie 118 as projected, either at the matrix barcode stage or at the payload data packet stage.

Then, at block 230 the data object 144 may be re-created from the payload data packets using the metadata. Finally, at block 232, an action may be taken corresponding to the data object 144. The action may directly involve the data object 144, for example, playing a video when the data object 144 is a video file. Alternatively, the data object 144 may be an executable file that runs on the processor 146 of the reader 128. In another embodiment, the data object 144 may simply have instructions that are followed in order to allow a different action to occur, such as unlocking a previously downloaded program or allowing access to a previously hidden website.

The technical effects of using a matrix barcode movie 118 to transfer information are the ability to limit distribution of large amounts of data to a well-defined physical space and to permit such a transfer using a fully passive, one-way transfer. Unlike radio frequency data broadcasts that radiate in every direction and require handshaking and leave a device signature, the optical transfer using the matrix barcode movie permits rapid transfer of large amounts of data to an anonymous target (i.e., the reader 128). Unlike the limited capacity of matrix barcodes, the matrix barcode movie 118 allows a virtually unlimited data capacity and data types beyond those defined for current matrix barcodes.

The use of a matrix barcode movie 118 to transfer a data object 106 between entities benefits the sender of the data by ensuring that the recipient is within a limited range of the projector 120 and presents the data in a format that is universally available to devices such as smartphones and tablets, that is via the device's camera. There is no need for communicating WiFi passwords or opening up either the sending or receiving devices to attacks via an unprotected radio network. Further, in the case where the video transfer is used to confirm presence, the use of the optical transfer ensures that the recipient is in a given physical proximity to the projector 120, rather than merely within WiFi range. The use of the matrix barcode movie 118 to transfer data also benefits the recipient in a similar way by allowing anonymous receipt of the information, without the need to log in to a network or otherwise leave an electronic footprint.

The figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A system for conveying information via matrix barcodes, the system comprising:
   a matrix barcode movie generator including:
     a parser that extracts individual payload data packets from a data object, the parser further generating metadata for each of the payload data packets;
     a converter that generates a separate matrix barcode for each payload data packet and its corresponding metadata; and
     a packager that places the separate matrix barcodes as frames into a matrix barcode movie at a predetermined frame rate;
   a projector including:
     a display device;
     a memory storing the matrix barcode movie; and
     a processor coupled to the display device and the memory, the processor programmed to play the matrix barcode movie on the display device at the predetermined frame rate; and
   a reader including:
     a camera operating at a framerate higher than the predetermined frame rate that captures each matrix barcode from the matrix barcode movie;
     a processor coupled to the camera;
     a memory storing executable code that causes the processor to examine each frame of the matrix barcode movie and extract the metadata and payload data from each frame of the matrix barcode movie, assemble and store in the memory the data object according to the metadata stored in each frame of the matrix barcode movie, and take an action responsive to the data object.

2. The system of claim 1, wherein the projector further includes a sensor that plays the matrix barcode movie responsive to a gesture proximate the display device.

3. The system of claim 1, wherein the reader is an application on a smartphone that alters the capture frame rate of a camera of the smartphone.

4. The system of claim 3, wherein the reader interprets a first matrix barcode in the matrix barcode movie to determine the frame rate required to capture the matrix barcode movie.

5. The system of claim 3, wherein the reader de-duplicates separate matrix barcodes captured more than once by the camera prior to extracting the metadata and payload data from each frame.

6. The system of claim 1, wherein the packager outputs the matrix barcode movie in an H.264 compatible format.

7. A reader for extracting a data object from a matrix barcode movie, the reader comprising:
   a camera;
   a memory storing executable instructions; and
   a processor coupled to the memory and the camera, the processor executing the instructions to cause the reader to:
      capture the matrix barcode movie, the matrix barcode movie including individual matrix barcodes as frames in a media platform;
      extract separate metadata and a payload data from each frame of the matrix barcode movie;
      assemble the separate payload data from each frame of the matrix barcode movie into the data object according to the metadata;
      take an action responsive to the data object.

8. The reader of claim 7, wherein the processor executes further instructions that cause the camera to adjust its video capture rate to greater than a framerate of the matrix barcode movie.

9. The reader of claim 8, wherein the processor captures one of a cover art of the matrix barcode movie to extract a frame rate of the matrix barcode movie.

10. The reader of claim 7, wherein the data object is executable code that is executed by the processor to take the action.

11. The reader of claim 7, wherein the data object is an image that is presented by the processor via a display.

12. The reader of claim 7, wherein the data object is a text object that is presented by the processor via a display.

13. The reader of claim 7, wherein the reader further comprises an input device and the processor receives a signal from the input device to begin capturing the matrix barcode movie via the camera.

14. The reader of claim 7, wherein the processor completes capture of the matrix barcode movie prior to extracting individual matrix barcodes from the matrix barcode movie.

15. The reader of claim 7, wherein the processor removes duplicate frames prior to extracting the metadata and payload data.

16. A method of generating a matrix barcode movie, the method comprising:
   receiving a data object, the data object larger than a capacity of a selected matrix barcode encoding type;
   parsing the data object into payload data packets;
   generating metadata for each of the payload data packets, the metadata including at least information related to a sequence of the payload data packets;
   rendering a matrix barcode image for each of the payload data packets and its corresponding metadata;
   encoding matrix barcode frames using the rendered matrix barcode images; and
   formatting the frames into a matrix barcode movie in a standard video container.

17. The method of claim 16, wherein the matrix barcode frames are in H.264 format and the container is an MP4 container type.

18. The method of claim 16, wherein the metadata for at least one frame includes a total number of frames.

19. The method of claim 16, wherein an encoding for the video container specifies a frame rate for the matrix barcode movie.

20. The method of claim 16, wherein the matrix barcode movie is embedded in another media platform.

* * * * *